United States Patent Office 3,419,291
Patented Dec. 31, 1968

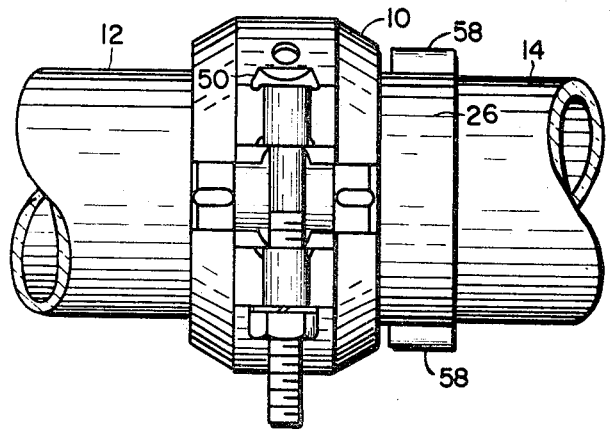
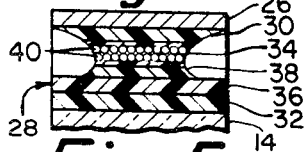
Fig. 4
Fig. 5
Fig. 1
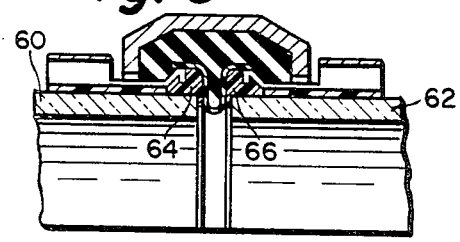
Fig. 6
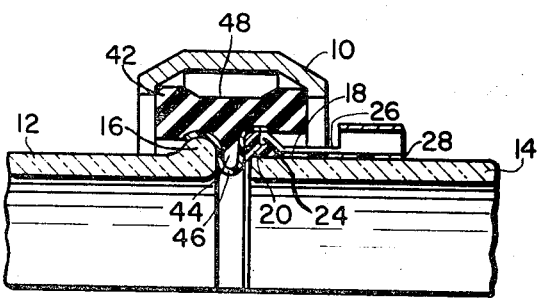
Fig. 2
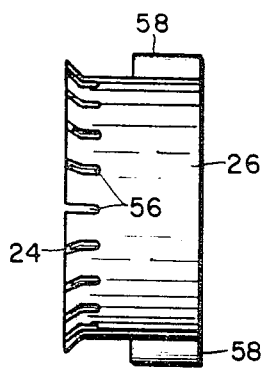
Fig. 7
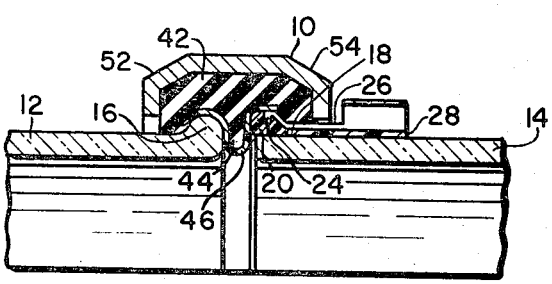
Fig. 3
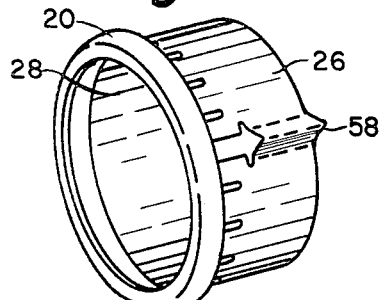
Fig. 8
INVENTORS.
WILLIAM H. TOMB
PETER E. WESEL
ANTHONY R. ZINE, Jr.
BY
William D. Fosdick
AGENT

3,419,291
PIPE COUPLING
William H. Tomb, Peter E. Wesel, and Anthony R. Zine, Jr., Corning, N.Y., assignors to Corning Glass Works, Corning, N.Y., a corporation of New York
Filed Jan. 30, 1967, Ser. No. 612,659
15 Claims. (Cl. 285—233)

ABSTRACT OF THE DISCLOSURE

A pipe coupling in which an annular bead-like adaptor member is held around the end of an unbeaded cylindrical section of glass pipe by means of a metal band bonded to the outer surface of the pipe and interlocking with the adaptor member. The metal band is bonded to the glass by a composite adhesive medium which includes circumferentially oriented glass fibers and a heat-shrinkable material. A second metal band maintains a flexible gasket around the adaptor member.

Background of the invention

The field to which this invention pertains is that of pipe couplings in fluid handling systems, and more particularly couplings having utility in joining unbeaded, cylindrical sections of glass pipe.

A common means for joining beaded sections of glass pipe is a coupling of the type described in Canadian Patent 691,860. In that coupling, a metal band having inwardly tapered edge portions bears upon a resilient annular gasket, which is bent by the band around the beaded ends of the joined pipe section and urges them toward one another to form a seal with an inwardly projecting rib on the gasket. Such coupling is not satisfactory for use with unbeaded pipe sections. Inasmuch as it is often inconvenient to form beads on glass pipe, particularly when the pipe is cut at the site of installation, it is advantageous to have a coupling capable of joining cylindrical pipe ends.

Summary of the invention

According to the invention, a coupling having utility in joining unbeaded pipe sections includes a discrete bead-like adapter member which is placed around the end of an unbeaded pipe section and which is held in place by an annular metal band which is bonded to the outer surface of the glass. Between the glass and the band is a composite adhesive medium. The adhesive medium includes a heat-shrinkable layer and a layer which includes a multitude of glass fiber portions extending in circumferential directions about the outer surface of the glass pipe between the metal band and the glass pipe. The heat-shrinkable layer is laminated to the layer which includes the circumferentially oriented glass fibers, such that when the heat-shrinkable material is elevated in temperature it shrinks in an axial direction with respect to the pipe, causing the glass fibers to become stacked in the area of the center of the space between the band and the glass, thereby increasing the radial thickness of the layer of glass fibers, while decreasing the axial extent thereof. The result is that the glass fibers tightly press outer adhesive layers of the adhesive composite medium against the inner surface of the metal band and the outer surface of the glass in order to provide intimate contact between the adhesive layers and the surfaces to which bonding is to be effected.

Brief description of the drawing

FIGURE 1 is a side elevational view of two sections of glass pipe joined by a coupling according to the invention.

FIGURE 2 is an axial sectional view through the coupling of FIGURE 1 prior to the tightening thereof.

FIGURE 3 is a view similar to that of FIGURE 2 showing the coupling subsequent to tightening.

FIGURE 4 is an enlarged sectional view illustrating the composite adhesive medium utilized in the coupling.

FIGURE 5 is a view of the composite adhesive medium of FIGURE 4 subsequent to the heating thereof.

FIGURE 6 is a view similar to that of FIGURE 3 illustrating a modified coupling according to the invention.

FIGURE 7 is a side view of the band used to hold the adaptor member in place.

FIGURE 8 is a perspective view of a component of the coupling at an intermediate stage of assembly of the coupling.

Description of the preferred embodiments

Referring in particular to FIGURES 1–3 of the drawing, the coupling of the invention comprises a clamping band 10 which surrounds the coupled ends of glass pipe sections 12 and 14. Pipe section 12 is provided with a bead 16 at its end, while pipe section 14 has a plain, cylindrical end 18. In order to adapt end 18 to the coupling and to provide a fluid-tight seal, an annular bead adaptor member 20 surrounds end 18 with its inner surface in contact with the outer surface of the glass pipe. Adaptor member 20 comprises a corrosion-resistant material, such as polytetrafluoroethylene. Bead adaptor member 20 is provided with an annular groove into which fits a tongue portion 24 of stainless steel adaptor member retaining band 26. Adaptor member retaining band 26 is, in turn, bonded to the outer surface of pipe section 14 by means of the composite adhesive medium illustrated in FIGURES 4 and 5.

Referring to FIGURES 4 and 5, composite adhesive medium 28 initially comprises five discrete layers. Each of the outer layers 30 and 32 comprises a modified acrylic copolymer resin which is capable of being softened and rendered adhesive by the action of heat and the simultaneous absorption of a plasticizer, such as diallyl phthalate. Layer 34 comprises a heat-softenable resin impregnated with a multitude of glass fibers. The glass fibers are oriented such that each fiber extends in a circumferential direction around the pipe end. Layer 36 comprises a standard fiber glass cloth, wherein glass fibers are contained in a plastic matrix. Each of layers 34 and 36 contains diallyl phthalate as a plasticizing agent for migration to layers 30 and 32. Layer 38 comprises a heat-shrinkable plastic material. The five layers are pressed tightly together and caused to adhere to the inner surface of band 26, prior to assembly of the coupling, as illustrated in FIGURE 8.

As shown in FIGURE 4, glass fibers 40 initially are spread out in an axial direction with respect to pipe section 14. After band 26 with the adhesive medium adhered to its inner surface is placed around the ends of pipe section 14, heat is applied to the interior of the pipe section by means of a heating coil. The assembly is heated to approximately 450° F. When the assembly reaches approximately 200° F., heat-shrinkable layer 38 contracts in an axial direction with respect to the pipe. Adherence between layers 34 and 38 causes layer 34 to contract in the same manner, thus tending to stack the glass fibers near the center of the coupling, as illustrated in FIGURE 5. The effect of the stacking of the fibers is to increase the radial thickness of the composite adhesive medium, thereby forming a tight fit between the adhesive medium and the inner surface of band 26 and the outer surface of pipe 14. When the temperature of the adhesive medium reaches 450° F., the resins become plastic and cure into a single integral structure.

Layers 30 and 32 may be formed as follows: 1200 grams of OR-250 Unithane White obtainable from American Cyanamid Company are mixed with 1824 grams of Polytex 913, obtainable from Celanese Corporation, and 416 grams of Solvesso 100, obtainable from Stoney-Mueller, Inc. The resultant mixture is ball milled approximately 16 hours, after which 352 grams of Polylink 980, obtainable from Celanese Corporation, 224 grams of Solvesso 100, 48 grams of butyl alcohol, 40 grams of Z-6040 silane, obtainable from Dow Corning Corporation, and 72 grams of 2-octanol are added to the mixture and the resultant mixture is ball milled for 2 hours. The resultant product is then painted on silicone-treated paper to a thickness of approximately 1 mil and the coated paper is warmed to approximately 140° F. to dry the mixture. The coating can then be removed from the paper for utilization in the adhesive medium of the pipe coupling.

Layer 34 may comprise parallel fibers of glass Owens-Corning type 893 with polyester compatible sizing, impregnated with a mixture of catalyzed diallyl phthalate and a diallyl phthalate prepolymer, such as Dapon, available from Ford Machinery Corporation. Each fiber may extend around the pipe through 360°, or more numerous shorter fibers may be used. Alternatively, a single helical fiber may form a plurality of revolutions about the pipe®.

Layer 36 may comprise Owens-Corning No. 181 fiber glass cloth, bolan treated, impregnated with diallyl phthalate. Since some of the fibers in this layer are oriented so as to have a component extending in an axial direction with respect to the pipe, the layer is resistant to contraction in the axial direction thereby maintaining the original axial extent of contact between the composite medium and the glass pipe, as illustrated in FIGURE 5. Alternatively, layer 36 may be fiber glass cloth with the glass fibers oriented unidirectionally parallel to the axis of the pipe.

Heart-shrinkable layer 38 may comprise Du Pont No. 65 HS Mylar.

Rubber gasket 42 surrounds bead 16 and bead adaptor 20 and has an annular inwardly projecting rib 44 located between the pipe ends. Rib 44 is covered by a corrosion-resistant liner 46 formed of polytetrafluoroethylene. Gasket 42 is provided with an external annual channel 48 to facilitate bending of the gasket around the bead adaptor.

When clamping band 10 is tightened about the pipe ends by means of bolt 50 to the position illustrated in FIGURE 3, the inner surfaces of its inwardly tapered edge portions 52 and 54 bear against the edges of the gasket to bend the gasket around bead 16 and bead adaptor 20, thereby pressing both the bead and the bead adaptor against gasket rib liner 46 to form fluid-tight seals therewith. At the same time, the bead adaptor is pressed tightly against the outer surface of pipe end 18 to form a fluid-tight seal between the inner surface of the bead adaptor and the outer surface of the pipe.

The coupling of the invention is assembled by first pressing adaptor retaining band 26 into interlocking relationship with the bead adaptor. Due to the fact that the tongue portion of the band is provided with a plurality of serations 56, it is able to expand radially to permit access to the groove in the bead adaptor. After the band and the bead adaptor have been locked together, adhesive medium 28 is pressed against the inner surface of the band. Due to the tendency of the layers of the adhesive medium to adhere to one another and to the inner surface of the band, the component comprising band, 26, bead adaptor member 20 and composite adhesive medium 28 may be retained as an integral unit until it is subsequently bonded to a piece of pipe. Such bonding is effected by placing the component over the ends of the pipe, drawing the band 26 tightly around the surface of the pipe by pinching ear portions 58 manually by means of pliers, and subsequently heating the assembly to approximately 450° F. to seal the composite adhesive medium to band 26 and pipe section 14 and to cure the polymers contained therein. Bead adaptor 20 may be initially stretched over a rigid disk to maintain it in an expanded state facilitating its placement over the pipe. The disk is removed immediately prior to assembly of the component in a coupling, at which time the bead adaptor begins to shrink to its original diameter.

The coupling of the invention may be utilized to join a beaded section of glass pipe to an unbeaded section of pipe, or to join two unbeaded sections. The latter arrangement is illustrated in FIGURE 6, wherein cylindrical pipe sections 60 and 62 are joined by means of bead adaptors 64 and 66.

Inasmuch as further variations may be made within the scope of the invention, it is intended that the scope of the invention be limited only by the scope of the appended claims.

We claim:
1. A coupling joining a first section of pipe at a cylindrical end thereof with a second section of pipe at an opposed end thereof, said coupling comprising:
   a resilient gasket surrounding said ends of said pipe sections,
   an inwardly projecting rib portion on said gasket,
   a first band surrounding said ends and urging said gasket in the direction of said ends, and
   means for maintaining said opposed end of said second pipe section in sealing relationship with said gasket,
   wherein the improvement comprises:
   a bead-like member surrounding said cylindrical end of said first section of pipe in sealing relationship therewith, and
   a second band surrounding said first pipe section and having a generally cylindrical portion bonded to the outer surface of said first pipe section in the vicinity of said cylindrical end and a locking portion in interlocking relationship with said bead-like member and retaining said bead-like member around said cylindrical end.

2. A coupling according to claim 1 in which said bead-like member has an annular groove about its outer surface, and
   said locking portion on said second band comprises a flange portion projecting into said groove.

3. A coupling according to claim 1 in which said bead-like member comprises polytetrafluoroethylene.

4. A coupling according to claim 1 wherein said second band is bonded to said first pipe section by a composite adhesive medium comprising at least one fiber comprising a plurality of portions in side-by-side relation, each portion extending circumferentially with respect to said first pipe section between the inner surface of said second band and the outer surface of said first pipe section,
   said fiber portions being included in a thermoplastic matrix.

5. A coupling according to claim 4 wherein said fiber portions comprise glass.

6. A coupling according to claim 1 in which said means comprises a bead at the said opposed end of said second pipe section integral therewith, and
   an inwardly tapered edge portion on said first band retaining a portion of said gasket around said bead, said first band and said gasket cooperating to urge said bead-like adaptor member and said bead in the direction of said rib on said gasket to maintain said adaptor member and said bead in sealing relation with said rib.

7. A coupling according to claim 6 in which said bead-like member has an annular groove about its outer surface, and
   said locking portion on said second band comprises a flange portion projecting into said groove.

8. A coupling according to claim 6 in which said bead-like member comprises polytetrafluoroethylene.

9. A coupling according to claim 6 wherein said second band is bonded to said first pipe section by a composite adhesive medium comprising at least one fiber comprising a plurality of portions in side-by-side relation, each portion extending circumferentially with respect to said first pipe section between the inner surface of said second band and the outer surface of said first pipe section, said fiber portions being included in a thermopastic matrix.

10. A coupling according to claim 9 wherein said fiber portions comprise glass.

11. A coupling according to claim 1 in which said means comprises a second bead-like member surrounding said opposed end of said second pipe section in sealing relationship with said gasket and with said opposed end, and a third generally cylindrical band bonded to the outer surface of said second pipe section in the vicinity of said opposed end and having a locking portion in interlocking relationship with said second bead-like member, said first band having an inwardly tapered edge portion urging said gasket against said second bead-like member to maintain said second bead-like member in sealing relationship with said rib portion on said gasket.

12. A coupling according to claim 11 in which each said bead-like member has an annular groove about its outer surface, and each said locking portion on said second and third bands comprises a flange portion projecting into said groove.

13. A coupling according to claim 11 in which each said bead-like member comprises polytetrafluoroethylene.

14. A coupling according to claim 11 wherein said second and third bands are bonded to said first and second pipe sections by composite adhesive media comprising at least one fiber comprising a plurality of portions in side-by-side relation, each portion extending circumferentially with respect to said pipe sections, said fiber portions being included in thermoplastic matrices.

15. A coupling according to claim 14 wherein said fiber portions comprise glass.

References Cited

UNITED STATES PATENTS

| 1,937,865 | 12/1933 | Baker | 285 |
| 2,207,813 | 7/1940 | McMahon et al. | |
| 3,186,743 | 6/1965 | Russell. | |
| 3,232,647 | 2/1966 | Kirchoff. | |
| 3,233,907 | 2/1966 | Stanton. | |
| 3,376,055 | 4/1968 | Donroe | 285—423 X |

EDWARD C. ALLEN, *Primary Examiner.*

THOMAS F. CALLAGHAN, *Assistant Examiner.*

U.S. Cl. X.R.

285—236, 423, 284; 156—86, 158; 138—109, 141